G. D. JONES.
ATTACHMENT FOR FISHING REELS.
APPLICATION FILED AUG. 26, 1919.
1,395,118.
Patented Oct. 25, 1921.
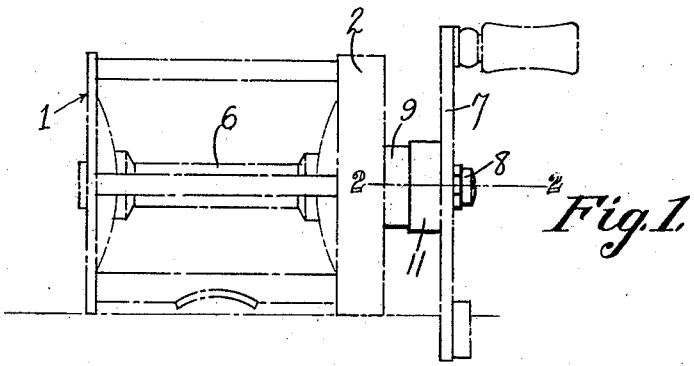
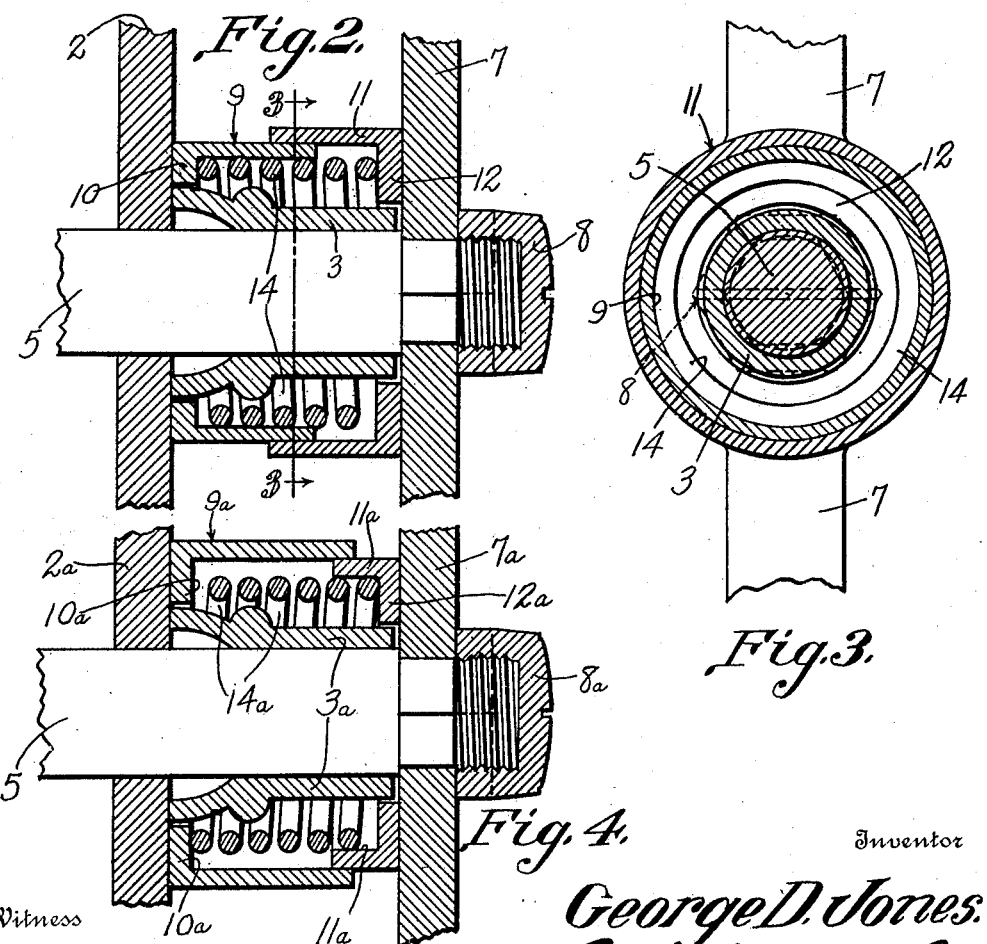
Inventor
George D. Jones.

UNITED STATES PATENT OFFICE.

GEORGE D. JONES, OF WINTERHAVEN, FLORIDA.

ATTACHMENT FOR FISHING-REELS.

1,395,118. Specification of Letters Patent. Patented Oct. 25, 1921.

Application filed August 26, 1919. Serial No. 319,891.

*To all whom it may concern:*

Be it known that I, GEORGE D. JONES, a citizen of the United States, residing at Winterhaven, in the county of Polk and State of Florida, have invented a new and useful Attachment for Fishing-Reels, of which the following is a specification.

It is the object of this invention to provide a novel means whereby back-lash in a fishing reel may be obviated, a consequent tangling of the line being avoided, during the operation of casting.

A further object of the invention is to provide a simple structure for the purpose above indicated, which may be mounted on known forms of reels without working changes therein.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing:—

Figure 1 shows, in side elevation, a reel whereunto the device forming the subject of this application has been applied.

Fig. 2 is a fragmental section on the line 2—2 of Fig. 1.

Fig. 3 is a section on the line 3—3 of Fig. 2, and

Fig. 4 is a section similar to Fig. 2 but showing a modification.

The numeral 1 marks the frame of a fishing reel, including a head 2 carrying a tubular bearing 3 in which a shaft 5 is journaled, the shaft being operatively connected in any desired way with the drum 6 of the reel. A crank 7 is held on the exposed end of the shaft 5 by means of a cap nut 8 or otherwise.

A thimble 9 surrounds the bearing 3 and abuts at its inner end against the head 2 of the reel, the thimble being provided at its inner end with a flange 10. A thimble 11 surrounds the bearing 3 and fits around the thimble 9 slidably, the thimble 11 being supplied at its outer end with a flange 12. A helical compression spring 14 is located about the bearing 3 and abuts at its ends against the flange 10 of the thimble 9 and against the flange 12 of the thimble 11. Obviously, due to the action of the spring 14, the thimbles 11 and 9 will be thrust in opposite directions, the thimble 9 bearing frictionally against the head 2, and the thimble 11 bearing frictionally against the crank 7. The flanges 12 and 10 serve to receive the ends of the compression spring 14 and give the thimble 9 an increased bearing on the head 2, owing to the presence of the flange 10, the thimble 11 having an increased bearing on the crank 7, owing to the presence of the flange 12.

In the modified form of the invention, parts hereinbefore described have been designated by numerals previously used, with the suffix "a." In the modified form, the thimble 11$^a$ is somewhat shorter than the thimble 11, the thimble 11$^a$ sliding on the inside of the thimble 9$^a$, instead of on the outside as hereinbefore described.

In either form of the invention, the thimbles may be described as telescoped members having terminal flanges between which a compression spring is located.

It will be obvious that the device forming the subject matter of this application embodies a simple but effective means whereby back lash in a fishing reel will be avoided, during the operation of casting. It is to be observed that, since the thimbles 9 and 11 are telescoped with respect to each other, and since the thimbles 9 and 11, are provided, respectively, with the flanges 10 and 12, the spring 14 is completely housed in and inclosed, it being practically impossible for moisture or foreign matter of any kind to find its way within the casing defined by the thimbles, to the detriment and deterioration of the spring.

Having thus described the invention, what is claimed is:—

In a fishing reel, a frame comprising a head; a drum journaled in the frame; a shaft rotatable in the head and connected operatively with the drum; a crank on the shaft; telescoped tubular members having their inner ends slidably interengaged and provided at their outer ends with flanges, one flange engaging the head, and the other flange engaging the crank, the telescoped members being disposed about the shaft; and a helical compression spring within said members and bearing against the flanges, to press the flanges against the head and the crank, said members constituting a housing for the spring.

In testimony that I claim the foregoing as my own, I have hereto affixed my signature in the presence of two witnesses.

GEORGE D. JONES.

Witnesses:
EARL L. HASKINS,
VIVIEN FRANTZEN.